United States Patent [19]
Matsumura et al.

[11] 3,892,719
[45] July 1, 1975

[54] PROCESS FOR PRODUCING LACTONIZED ACRYLIC POLYMER PRODUCTS

[75] Inventors: Yasuo Matsumura; Kunio Maruyama; Minoru Akiyama; Katsutoshi Kanetsuki, all of Okayama, Japan

[73] Assignee: Japan Exlan Company Limited, Japan

[22] Filed: Oct. 11, 1973

[21] Appl. No.: 405,638

Related U.S. Application Data
[63] Continuation of Ser. No. 203,886, Dec. 1, 1971, abandoned.

[30] Foreign Application Priority Data
Dec. 29, 1970  Japan............................... 45-125336

[52] U.S. Cl................ 260/79.3 MU; 260/29.6 TA; 260/78.3 U; 260/79.3 R; 260/79.3 MU; 260/80.76; 260/80.81; 260/85.5 ES; 264/178
[51] Int. Cl......................... C08f 15/02; C08f 27/14
[58] Field of Search.. 260/29.6 AB, 29.6 R, 79.3 M, 260/80.72, 80.76, 80.81, 78.3 U, 85.5 R, 85.5 ES, 85.5 S

[56] References Cited
UNITED STATES PATENTS

| | | | |
|---|---|---|---|
| 2,265,033 | 12/1941 | Fryer | 18/54 |
| 2,963,457 | 12/1960 | Miller | 260/29.6 |
| 3,077,371 | 2/1963 | Schoeneberg | 8/107 |
| 3,515,706 | 6/1970 | Minato | 260/85.5 |
| 3,717,603 | 2/1973 | Matsumura | 260/29.6 |

*Primary Examiner*—Christopher A. Henderson
*Attorney, Agent, or Firm*—Wenderoth, Lind & Ponack

[57] ABSTRACT

The present invention relates to a method for producing a lactonized acrylic product by treating an acrylic copolymer containing at least 50 mol percent of an acrylonitrile and a monomer having a hydroxyl group and/or monomer capable of forming a hydroxyl group or an article shaped from such copolymer with an acid medium containing 40 percent or less of an organic and/or inorganic acid and having a pH not higher than 2, characterized by adding at least 0.01 mol/liter of at least one compound selected from nitrates, oxyacids of chlorine and their salts to said acid medium. By the addition of the aforementioned compounds, the whiteness of the lactonized products is improved as well as the general physical properties thereof.

8 Claims, No Drawings

PROCESS FOR PRODUCING LACTONIZED ACRYLIC POLYMER PRODUCTS

This is a continuation of application Ser. No. 203,886, filed Dec. 1, 1971, now abandoned.

This invention relates to a process for producing lactonized acrylic polymer products. More particularly the present invention relates to a process for quickly and easily producing a lactonized acrylic polymer products by treating an acrylic copolymer containing acrylonitrile and a monomer having hydroxyl group and/or a monomer capable of forming hydroxyl group or an article shaped from such copolymer in an acid redium having a pH not higher than 2, characterized by adding at least one compound selected from the group consisting of nitrates, oxyacids of chlorine and their salts.

In U.S. Pat. No. 3,515,706 there is disclosed a method to selectively form lactone ring in an acrylic polymer by treating an acrylic copolymer consisting of acrylonitrile and a monomer having hydroxyl group or a monomer capable of forming hydroxyl group in a medium of a pH less than 2 containing an acid in a concentration less than 40 percent.

However, in such lactonizing reaction, in order to complete the reaction, the time required for the treatment is so long that there has been difficulty in adopting such method as an industrial process for producing lactonized acrylic polymers.

We have made extensive researches to develop a method of quickly and easily obtaining lactonized acrylic polymer products having no discoloring and excellent in general uses, and have found that, when at least one compound selected from the group consisting of nitrates, oxyacids of chlorine and their salts is added to the acidic treating medium to conduct the lactonization, the lactonizing reaction will be conducted easily and accelerated remarkably. We have further found that when a small amount of $ClO^-$ is present in the reaction system, the discoloring of the polymer product will be remarkably inhibited and only the lactonizing reaction will selectively proceed.

A principal object of the present invention is to easily and quickly produce lactonized acrylic polymer products having no discoloring by an industrially advantageous method.

A more particular object of the present invention is to advantageously obtain lactonized acrylic polymer products by treating an acrylic copolymer containing acrylonitrile and a monomer having hydroxyl group and/or a monomer capable of forming hydroxyl group or an article shaped from said copolymer in an acid medium containing a compound selected from the group consisting of nitrates, oxyacids of chlorine and their salts.

Another object of the present invention is to obtain lactonized acrylic polymer products remarkably improved in the whiteness by adding an oxyacid of chlorine or its salt which can produce $ClO^-$ in an acid medium for the lactonization of acrylic polymer products.

Other objects and advantages of this invention will be apparent from the following description.

The above mentioned objects of the present invention are attained by treating an acrylic copolymer containing acrylonitrile and a monomer having hydroxyl group and/or a monomer capable of forming hydroxyl group or an article shaped from said copolymer in an acid medium of a pH less than 2 and containing an organic and/or inorganic acid for the lactonization, characterized by adding to said acid medium at least one compound selected from the group consisting of nitrates, oxyacids of chlorine and their salts. Further the whiteness of the resulting lactonized acrylic products can be improved by adding to said acid medium at least one of oxyacids of chlorine or their salts together with a nitrate.

Such oxyacids of chlorine and their salts to be used for the promotion of the lactonization and to prevent the discoloring of resulting lactonized acrylic polymer products are perchloric acid, chloric acid, chlorous acid and hypochlorous acid or their alkali metal or alkaline earth metal salts such as sodium, potassium, calcium, magnesium, zinc, etc. and their ammonium salts. When at least 0.01 mol/liter of such compound is present in the acid medium, a favorable discoloring preventing effect is obtained. When the amount of such chlorine compound in the acid medium is less than 0.01 mol/liter, it will be difficult to obtain a sufficient discoloring preventing effect. Further, the upper limit of the amount such discoloration preventing agent may vary depending on the lactonizing conditions and is difficult to determine as a general rule. However economically it is preferable that the amount is less than 5 mol/liter in the acid medium.

Further, irrespective of whether a single acid or a mixed acid is used, it is desirable that the lactonizing reaction takes place in an acid medium of an acid concentration less than 40 percent. The use of an acid concentration more than 40 percent is undesirable because a large amount of carboxylic acid will be by-produced in the lactonized polymer product. The lower limit of the acid concentration is not critical. However, when the pH is more than 2, the lactonizing reaction will become so slow that it is not desirable.

The inorganic and/or organic acid used as an acid medium for conducting the lactonization are inorganic acids such as nitric acid, sulfuric acid, hydrochloric acid, phosphoric acid, etc. and organic acid such as formic acid, acetic acid, oxalic acid, toluene sulfonic acid, etc. The nitrate to be used along with these acids to accelerate the lactonization includes salts of alkali metals, alkaline earth metals and ammonium salts such as potassium nitrate, sodium nitrate, calcium nitrate, ammonium nitrate, etc. The amount of such nitrate varies depending on the kind of the organic or inorganic acid to be used therewith and the lactonizing reaction conditions and is difficult to define at once but is properly determined by the amount of the desired lactone unit to be introduced. However, generally, it is preferable that such nitrate is added in an amount of 0.01 mol/liter–5 mol/liter in the acid medium.

The lactonizing reaction which is conducted with use of such acid at the foregoing acid concentration is generally carried out at room temperature (20°C.) to 200°C., preferably at 50° to 150°C.

The amount of the lactone unit to be introduced into the copolymer article can be determined as desired by properly selecting acid-treating conditions such as treating temperature and time at the above-mentioned acid concentration. Further, this acid-treatment can be applied to either of the uniform system and nonuniform system. In treating an acrylic shaped article for lactonization, it is of course preferable to conduct the treatment in a nonuniform system.

Further, the monomer which can produce a hydroxyl group is such monomer copolymerizable with acrylonitrile and capable of producing a hydroxyl group by being decomposed under the lactonizing conditions as vinyl or allyl compounds of carboxylic acids having 1 to 21 carbon atoms or ethers and substituted compounds thereof with halogen atoms, hydrocarbon groups or halohydrocarbon groups having 1 to 20 carbon atoms. Preferable compounds are vinyl carboxylates, allyl carboxylates, vinyl hydrocarbyl or halohydrocarbyl ethers and allyl hydrocarbyl or halohydrocarbyl ethers, said hydrocarbyl or halohydrocarbyl group having 1 to 20 carbon atoms.

Examples of said preferred unsaturated ester of carboxylic acid having 1 to 21 carbon atoms are vinyl formate, vinyl acetate, vinyl propionate, vinyl butyrate, vinyl caproate, vinyl isocaproate, vinyl caprylate, vinyl pelargonate, vinyl 2-ethyl-hexylcarboxylae, vinyl stearate, vinyl levulinate, ethylvinyl oxalate, vinyl chloroacetate, vinyl dichloroacetate, vinyl benzoate, vinyl cyclohexanecarboxylate, vinyl norbornane-2-carboxylate, allyl acetate, allyl propionate, allyl butyrate, allyl laurate, allyl benzoate, allyl cycloheptanecarboxylate, allyl chloroacetate, 2-chloroallyl acetate, isopropenyl acetate, isopropenyl butyrate, isopropenyl norbornane-2-carboxylate, α-methallyl acetate, β-methallyl acetate, γ-methallyl acetate, methallyl propionate, methylmethallyl oxalate, γ-methallyl benzoate, and 1-propenyl acetate. Among those compounds, vinyl esters of fatty acids are frequently used. The most preferable compounds are vinyl acetate and vinyl propionate.

Examples of said preferred unsaturated ethers are vinyl methyl ether, isopropenyl methyl ether, β-chlorovinyl methyl ether, β-bromovinyl methyl ether, vinyl ethyl ether, isopropenyl ethyl ether, β-chlorovinyl ethyl ether, β-bromovinyl ethyl ether, vinyl 2-chloroethyl ether, vinyl trifluoroethyl ether, vinyl propyl ether, vinyl isopropyl ether, β-chlorovinyl isopropyl ether, vinyl butyl ether, β-chlorovinyl butyl ether, vinyl isobutyl ether, β-chlorovinyl isobutyl ether, β-bromovinyl isobutyl ether, vinyl tert-butyl ether, vinyl neopentyl ether, vinyl n-hexyl ether, vinyl 2-ethylhexyl ether, vinyl octyl ether, vinyl cyclohexyl ether, vinyl phenyl ether, α-chlorovinyl phenyl ether, vinyl p-methylphenyl ether, vinyl p-chlorophenyl ether, α-bromovinyl phenyl ether, vinyl 2-chlorophenyl ether, vinyl 2,4-dichlorophenyl ether, vinyl 2,3,4-trichlorophenyl ether, vinyl α-naphthyl ether, vinyl benzyl ether, vinyl p-chlorobenzyl ether, vinyl α,α-dimethylbenzyl ether, allyl methyl ether, allyl ethyl ether, allyl 2-chloroethyl ether, allyl propyl ether, allyl isopropyl ether, allyl butyl ether, allyl isobutyl ether, allyl tert-butyl ether, allyl octyl ether, allyl phenyl ether, allyl p-chlorophenyl ether, allyl 2-chlorophenyl ether, allyl 2,4-dichlorophenyl ether, allyl α-naphthyl ether, allyl benzyl ether, methallyl methyl ether, methallyl ethyl ether, methallyl propyl ether, methallyl isopropyl ether, methallyl butyl ether, methallyl isobutyl ether, methallyl tert-butyl ether and methallyl phenyl ether. Among these compounds, vinyl alkyl ethers and vinyl haloalkyl ethers are frequently used.

The acrylic copolymer containing acrylonitrile and such monomer having hydroxyl group and/or such monomer capable of forming hydroxyl group is obtained by a well known suspension polymerization, emulsion polymerization or solution polymerization process.

The proportions of the acrylonitrile, the monomer having hydroxyl group and/or the monomer capable of forming hydroxyl group and any other unsaturated monomer which may be introduced as required to form the acrylic copolymer in the present invention may be properly determined by the amount of the lactone unit to be contained in the resulting lactonized polymer or the amount of introduction of the above-mentioned unsaturated monomer. However generally it is preferable to have acrylonitrile contained in an amount of at least 50 mol percent. On the other hand, there can be used an acrylic copolymer of a composition consisting of less than 50 mol percent acrylonitrile, the rest being a monomer having hydroxyl group and/or a monomer capable of forming hydroxyl group and any other unsaturated monomer properly introduced as required.

Further, insofar as a maredly adverse effect on the resulting lactonized polymer is avoided, part of the acrylonitrile forming the acrylic copolymer can be replaced with unsaturated monomer which can form carboxyl groups i.e. acrylic acid or methacrylic acid esters such as methyl acrylate, ethyl acrylate, methyl methacrylate, etc.; acrylamides or their derivatives such as acrylamide or methacrylamide so that the carboxyl group formed by the lactonizing reaction of this invention may also be utilized to form lactone ring.

When such acrylic copolymer or shaped article prepared from the copolymer in the form of a fiber or film is treated in an acid medium according to the present invention, a five-member ring or six-member ring lactone unit having the following structure:

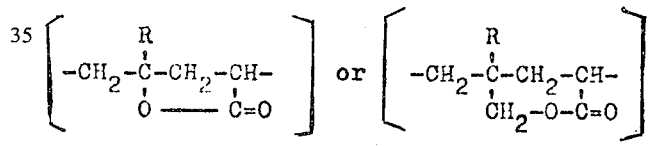

wherein R is hydrogen or a methyl group will be formed in the main chain of the polymer.

Further, the lactonized acrylic copolymer having such lactone ring structure and obtained by the treatment in the form of a polymer is soluble in known solvents for polyacrylonitriles such as organic solvents like dimethyl sulfoxide, dimethyl formamide, dimethyl acetamide, γ-butyrolactone and ethylene carbonate and inorganic solvents like nitric acid, concentrated aqueous solution of zinc chloride and concentrated aqueous solution of thiocyanates and may be formed into a shaped article such as a fiber or film by a well-known dry, wet or semi-melt spinning process or film making process.

Formation of lactone rings in the main chain of a high molecular weight polymer as introduced in the present invention restricts the mobility or freedom of the molecular chain, so that the shaped article such as a fiber or film made from a copolymer having such cyclized structure or directly introduced by the lactonizing treatment according to the present invention is higher in strength and Young's modulus than the one made from an ordinary copolymer having no cyclized structure, that is, from an acrylic copolymer not lactonized by acid-treatment and is remarkably improved particularly in the tendency to elongation in hot water which is a defect of acrylic fibers.

The following examples are given for a better understanding of the present invention and are not intended to limit the scope of the present invention. The percentages and parts shown in the examples are all based on the weight unless otherwise specified.

The lactone unit amount given in the following examples is expressed in percentage by weight in the polymer of the group

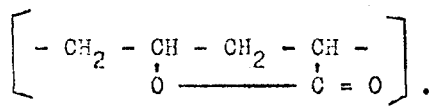

This analysis was conducted on an infrared ray absorption band of 1176 cm$^{-1}$ of a copolymer obtained by using as a standard a copolymer of a known lactone amount synthesized from a copolymer of methyl acrylate and vinyl acetate by the method described on pages 142 to 154 of "Chemistry of High Polymers" ("Kobunshi Kagaku" in Japanese) Vol. 7 (1950).

Further, the colored degree of the copolymer was calculated from the following formula by determining the reflection rates at the three wave lengths of 453 m$\mu$, 553 m$\mu$ and 595 m$\mu$ from the visible reflection curve of the sample with magnesium oxide by forming a produced lactonized polymer into tablets under an elevated pressure:

$$\text{Colored degree} = \frac{\text{Reflection rate at 595 m}\mu - \text{Reflection rate at 453 m}\mu}{\text{Reflection rate at 553 m}\mu} \times 100$$

It is shown that the greater this numerical value, the higher the colored degree.

EXAMPLE 1

10 parts of an acrylic copolymer consisting of 79.5 percent acrylonitrile, 20 percent vinyl acetate and 0.5 percent methallyl sulfonate acid were added to 100 parts of 20 percent sulfuric acid aqueous solution added with various additives as shown in Table 1. The mixture was boiled for 1 hour with stirring for lactonization. The resulting polymer was washed with water and dried. The lactone unit content and colored degree were measured and the results are given in Table 1. As apparent from the results in Table 1, it was ascertained that the addition of nitrate or salts of oxyacids of chlorine in accordance with this invention to the acid medium accelerates lactonization a great deal to produce a great amount of lactone unit and that the addition of oxyacid of chlorine to the acid system containing nitrate remarkably improves the whiteness of the resulting lactonized polymer.

Table 1

| No. | Salt added | Amount (parts) | Lactone unit content (%) | Colored degree |
|---|---|---|---|---|
| 1 | — | — | 6.5 | — |
| 2 | NaClO$_3$ | 4 | 9.4 | — |
| 3 | NaNO$_3$ | 4 | 12.5 | — |
| 4 | NaNO$_3$ | 10 | 21.4 | 18.3 |
| 5 | NH$_4$NO$_3$ | 10 | 22.0 | 18.5 |
| 6 | NaNO$_3$ / NaClO$_3$ | 10 / 1 | 21.0 | 5.5 |
| 7 | NH$_4$NO$_3$ / Ca(ClO$_2$)$_2$ | 10 / 2 | 21.5 | 4.1 |

EXAMPLE 2

10 parts of the same acrylic copolymer as used in Example 1 were added to 90 parts of a 12 percent aqueous solution of nitric acid. Then 0.4, 1.6 or 4.0 parts of sodium chlorate was further added to the mixture. The mixture was boiled for 1 hour with stirring. The resulting lactonized copolymer was washed with water and dried. The lactone unit content and colored degree were measured and the results are given in Table 2. As apparent from the results in Table 2, it was ascertained that the lactonization is accelerated and the lactonized polymer is remarkably improved in the whiteness by adding sodium chlorate.

Table 2

| Amount of sodium chlorate used | Lactone unit content (%) | Colored degree |
|---|---|---|
| 0.4 part (0.05 mol/liter) | 18.0 | 7.0 |
| 1.6 parts (0.2 mol/liter) | 19.5 | 4.6 |
| 4.0 parts (0.5 mol/liter) | 20.1 | 2.8 |
| No addition | 17.8 | 16.5 |

EXAMPLE 3

1.6 kg. of a copolymer consisting of 89 percent acrylonitrile and 11 percent vinyl acetate were dispersed in 8 kg. of 15 percent nitric acid. 64 g. of sodium chlorate was added to the dispersion and the mixture was boiled for 1 hour with stirring for lactonization. The solid polymer was separated, washed with water and dried to obtain a lactonized polymer having a lactone unit content of 10.1 percent and an improved whiteness of a colored degree of 2.7. On the other hand, when the same system but containing no sodium chlorate was used there was obtained a markedly colored lactonized polymer of a colored degree of 18.5.

A spinning solution was prepared by dissolving 11 parts of the lactonized polymer thus produced in 89 parts of a 46 percent aqueous solution of sodium thiocyanate and was extruded for coagulation into a 12 percent aqueous solution of sodium thiocyanate at −3°C. through a nozzle of 1000 orifices of an orifice diameter of 0.09 mm$\phi$. The resulting fiber was stretched twice the original length in this coagulating bath, then washed with water and was further stretched 6 times the length in boiling water. The fiber was dried in hot air at 115°C. under a relative humidity of 20 percent, then relaxed in compressed steam at 140°C. and was further dried to make a fiber of a monofilament fineness of 3 deniers. Further, for comparison, the same copolymer was spun in the same manner without lactonization except that the relaxing temperature was set at 115°C. due to a remarkable shrinkage.

The properties of the two kinds of fibers thus prepared are given in Table 3.

Table 3

|  | Breaking strength (g/d) | Breaking elongation (%) | Young's modulus at 20°C. (g/d) | Young's modulus in hot water at 95°C. (g/d) | Breaking elongation in hot water at 95°C. (%) |
| --- | --- | --- | --- | --- | --- |
| Fiber of this invention (lactonized) | 4.5 | 29 | 62 | 1.4 | 80 |
| Conventional fiber (not lactonized) | 3.3 | 45 | 43 | 0.5 | 180 |

As apparent from Table 3, the fiber produced from the lactonized acryl polymer according to the present invention was high in strength and Young's modulus and was remarkably improved in the tendency to elongation in hot water.

EXAMPLE 4

10 parts of an acrylic copolymer consisting of 79.5 percent acrylonitrile, 20 percent vinyl acetate and 0.5 percent of methallyl sulfonate acid were added to 100 parts of each of various aqueous acid mediums as given in Table 4, and the mixture was boiled for one hour with stirring for lactonization. After washing with water and drying the resulting polymer, the lactone unit content and colored degree were measured. The results are shown in Table 4.

Table 4

|  | Concentration of acid and additive in acid medium | Treated for 1 hour Lactone unit contents(%) | Colored degree | Treated for 2 hours Lactone unit contents(%) | Colored degree |
| --- | --- | --- | --- | --- | --- |
| Comparison | 20 % sulfuric acid | 6.5 | — | 11.2 | — |
| Example | 15 % sulfuric acid + 5 % nitric acid | 16.0 | 17.0 | 18.9 | 18.5 |
| This | 10 % sulfuric acid + 5 % nitric acid + 5 % perchloric acid | 19.5 | 7.5 | — | — |
|  | 15 % sulfuric acid + 5 % nitric acid + 1 % sodium chlorate | 18.7 | 5.5 | 19.4 | 5.7 |
| invention | 15 % sulfuric acid + 5 % nitric acid + 2 % sodium hypochlorite | — | — | 18.2 | 4.6 |
| Comparison | 15 % PTS* | 11.0 | — | 14.0 | — |
| Example | 10 % PTS + 5 % nitric acid | 16.0 | 15.0 | 18.5 | 17.5 |
| This invention | 10 % PTS + 5 % nitric acid + 1 % sodium chlorate | 18.1 | 6.5 | 21.8 | 7.1 |

*PTS paratoluene sulfonic acid.

EXAMPLE 5

200 parts of the same copolymer as in Example 1 were added into an acid medium consisting of 150 parts of sulfuric acid, 100 parts of paratoluene sulfonic acid, 17 parts of 60 percent perchloric acid and 750 parts of water. The mixture was boiled for 2.5 hours while stirring. Then the polymer was washed with water and dried to obtain a lactonized polymer having a lactone unit content of 20.5 percent and a very excellent whiteness of a colored degree of 4.1 percent.

A spinning solution was prepared by dissolving 12 parts of the thus obtained lactonized polymer in 88 parts of a 48 percent aqueous solution of sodium thiocyanate and was extruded for coagulation into a 12 percent aqueous solution of sodium thiocyanate at −3°C. through a nozzle of 100 orifices of an orifice diameter of 0.09 mm. The thus obtained fiber was stretched twice the original length in this coagulating bath, then washed with water and stretched 8 times the length in boiling water. Then the fiber was dried in hot air at 120°C. under a relative humidity of 20 percent, relaxed in pressurized steam at 125°C. for 10 minutes and was further dried at 105°C. to make a fiber of a monofilament fineness of 3 deniers.

As shown in Table 5, the thus obtained fiber showed very excellent physical properties. By the way, for comparison, when the same copolymer was spun in the same manner without being lactonized, the obtained fiber shrank in the drying and relaxing steps so remarkably as not to be satisfactory.

Table 5

| Breaking strength | 4.3 g./d. |
| --- | --- |
| Breaking elongation | 30 % |
| Young's modulus at 20°C. | 63 g./d. |
| Young's modulus in hot water at 95°C. | 1.0 g./d. |

EXAMPLE 6

10 parts of a copolymer consisting of 73 percent acrylonitrile, 18 percent vinyl acetate and 9 percent vinylidene chloride were added into 90 parts of a solution of sulfuric acid alone or a mixed solution (of sulfuric acid + perchloric acid) at each of various mixing ratio and were boiled for 1 or 4 hours while being agitated to be lactonized. The treating conditions and the contents of the produced lactone unit in the resulting polymers are indicated in Table 6.

As evident from the results shown in Table 6, when the lactonizing treatment was carried out in the mixed system with perchloric acid, the lactonizing reaction was accelerated more remarkably than in the system of sulfuric acid alone. By the way, a film made from a solution prepared by dissolving the lactonized polymer of a lactone unit content of 17.7 percent in dimethylformamide had a flame-resistance higher than of a film made from a polymer containing no lactone unit.

Table 6

| Sulfuric acid/perchloric acid in the acid medium (%) | | Lactone unit content (%) | |
|---|---|---|---|
| | | Treated for 1 hour | Treated for 4 hours |
| 19.6/0.5 | (4.6/0.05)* | 8.5 | 15.8 |
| 19.3/1.0 | (4.6/0.1) | 10.5 | 16.2 |
| 17.4/5.0 | (4.6/0.5) | 15.1 | 16.8 |
| 15.9/9.0 | (4.6/1.0) | 15.9 | 17.7 |
| 20.0/0 | (4.6/0) | 5.4 | 14.2 |

*The numbers in the parenthesis ( ) represent the sum of the normalities of the sulfuric acid and perchloric acid and the normality of the perchloric acid in the acid medium.

EXAMPLE 7

10 Parts of an acrylic copolymer consisting of 90 percent acrylonitrile and 10 percent isopropenyl acetate were dispersed in 50 parts of an acid medium consisting of 15 parts of paratoluene sulfonic acid, 10 parts of perchloric acid and 75 parts of water, and the suspension was agitated at 100°C. for 2 hours to obtain a white lactonized polymer of a lactone unit content of 9.5 percent. The lactone unit was calculated as a group of

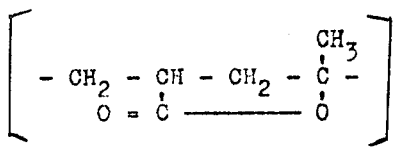

For comparison, the same procedure was repeated except that sulfuric acid was used in place of perchloric acid. The resulting lactonized polymer contained only 6.0 percent of lactone unit and the coloration was very noticeable.

EXAMPLE 8

10 parts of acrylic fiber prepared from a copolymer consisting of 89 percent of acrylonitrile and 11 percent of vinyl acetate was immersed in a mixture of 500 parts of 20 percent aqueous solution of perchloric acid and 500 parts of 20 percent sulfuric acid aqueous solution. Treatment at 90°C. for 2 hours gave 9.5 percent of lactone unit in the fiber. On the other hand, lactonization was conducted using 100 parts of a 20 percent aqueous solution of sulfuric acid in place of the mixed acid solution, which gave only 3.0 percent of lactone unit. The fiber treated was much inferior in whiteness to the fiber lactonized in accordance with the process of this invention.

EXAMPLE 9

10 Parts of an acrylic copolymer consisting of 79.5 percent acrylonitrile, 20 percent vinyl acetate and 0.5 percent methallyl sulfonic acid were added into 100 parts of an aqueous solution containing 15 percent sulfuric acid and 3.5 percent potassium perchlorate. The mixture was boiled for 1 hour while stirring for lactonization. The resulting lactonized polymer was washed with water and dried. The lactone unit content and colored degree are as indicated in Table 7 which also indicates the data obtained when the lactonization was conducted in the absence of perchlorate.

Table 7

| | Added salt | Lactone unit content (%) | Colored degree |
|---|---|---|---|
| Comparison | — | 5.5 | 4.2 |
| This invention | KClO$_4$ | 18.8 | 3.2 |

What we claim is:

1. In a method for producing a lactonized acrylic product by treating an acrylic copolymer containing at least 50 mol percent acrylonitrile and at least one monomer having a hydroxyl group or capable of forming a hydroxyl group or a fiber or film shaped from such copolymer with an acid medium containing 40 percent or less of an acid selected from the group consisting of an organic acid, an inorganic acid and mixtures thereof having a pH not higher than 2, the improvement comprising adding to said acid medium at least one compound selected from the group consisting of oxyacids of chlorine and the alkaline metal, alkaline earth or ammonium salts thereof in an amount of at least 0.01 mol/liter.

2. A method as claimed in claim 1 wherein the amount of the said compound additive is not higher than 5 mol/liter in the acid medium.

3. A method as claimed in claim 1 wherein the additive compound is an oxyacid of chlorine or its salt selected from the group consisting of perchloric acid, chloric acid, chlorous acid and hypochlorous acid and the salts of alkali metals, alkaline earth metals and ammonium.

4. A method as claimed in claim 1 wherein the monomer having a hydroxyl group is selected from allyl alcohol and methallyl alcohol.

5. A method as claimed in claim 1 wherein the monomer capable of forming a hydroxyl group is selected from the group consisting of vinyl or allyl compounds of carboxylic acids or ethers and substituted compounds thereof with halogen atoms, hydrocarbon groups or halohydrocarbon groups.

6. A method as claimed in claim 1 wherein the monomer capable of forming a hydroxyl group is a vinyl ester of a fatty acid.

7. A method as claimed in claim 6 wherein said vinyl ester is vinyl acetate or vinyl propionate.

8. A method as claimed in claim 1 wherein the copolymer consists of (1) at least 50 percent by mol of acrylonitirle, (2) at least one monomer having a hydroxyl group or a monomer which can produce a hydroxyl group and (3) at least one monomer selected from the group consisting of allyl sulfonic acid, methallylsulfonic acid and their salts, styrene, vinyl chloride, vinyl bromide and vinylidene chloride.

* * * * *